(12) United States Patent
Beitia

(10) Patent No.: US 6,889,550 B2
(45) Date of Patent: May 10, 2005

(54) PLANAR MECHANICAL RESONATOR SENSITIVE ALONG AN AXIS PERPENDICULAR TO ITS PLANE

(75) Inventor: José Beitia, Saint Prix (FR)

(73) Assignee: SAGEM SA, Paris (FR)

( * ) Notice: Subject to any disclaimer, the term of this patent is extended or adjusted under 35 U.S.C. 154(b) by 0 days.

(21) Appl. No.: 10/468,217

(22) PCT Filed: Jan. 29, 2002

(86) PCT No.: PCT/FR02/00344

§ 371 (c)(1),
(2), (4) Date: Jan. 15, 2004

(87) PCT Pub. No.: WO02/068906

PCT Pub. Date: Sep. 6, 2002

(65) Prior Publication Data

US 2004/0112134 A1 Jun. 17, 2004

(30) Foreign Application Priority Data

Feb. 23, 2001 (FR) .............................. 01 02498

(51) Int. Cl.⁷ ................................................ G01P 9/04
(52) U.S. Cl. ............................... 73/504.12; 73/504.04; 73/504.13
(58) Field of Search .......................... 73/504.02, 504.04, 73/504.12, 504.13, 504.14, 504.15

(56) References Cited

U.S. PATENT DOCUMENTS

| 5,226,321 | A |   | 7/1993 | Varnham et al. |
| 5,915,276 | A | * | 6/1999 | Fell .......................... 73/504.13 |
| 6,089,090 | A | * | 7/2000 | Namerikawa et al. ... 73/504.13 |
| 6,192,756 | B1 |   | 2/2001 | Kiruchi |
| 6,439,050 | B1 | * | 8/2002 | Musalem et al. ........ 73/504.12 |

FOREIGN PATENT DOCUMENTS

FR          2838820         * 10/2003

* cited by examiner

*Primary Examiner*—Helen Kwok
(74) *Attorney, Agent, or Firm*—Stites & Harbison PLLC; Douglas E. Jackson

(57) ABSTRACT

The invention concerns a mechanical resonator with a planar monolithic vibrating structure extending along a closed contour whereof the axis of sensitivity is substantially perpendicular to the plane of said structure. The invention is characterised in that the planar structure (1) is a regular convex polygon with 4*k* vertices (3) (k being the order of the vibrational mode implemented when the resonator is vibrated) and is suspended to a fixed base (4, 5) via n suspension arms (2) with substantially radial extension arranged substantially symmetrically.

17 Claims, 7 Drawing Sheets

PLANAR MECHANICAL RESONATOR SENSITIVE ALONG AN AXIS PERPENDICULAR TO ITS PLANE

Figure 1A:
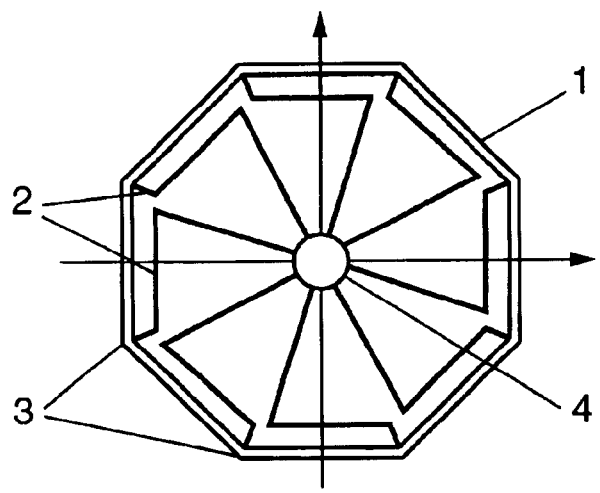

The present invention relates in a general manner to the field of mechanical resonators useable in gyrometric or gyroscopic inertial sensors, and it more particularly relates to such mechanical resonators which possess a plane monolithic vibrating structure made of an appropriate material supported by a substrate and thus able to be fabricated by conventional techniques of chemical etching, laser etching or the like which are commonly used for the fabrication of microstructures.

Embodiments of such mechanical resonators of planar type are nowadays numerous. Thus, resonators sensitive along an axis contained in the plane of the resonator are known (for example FR-A-2 685 964) and resonators sensitive along two orthogonal axes contained in the plane of the resonator are also known (for example FR-A-2 741 151).

A mechanical resonator with vibrating structure extending along a closed annular contour of revolution or square contour sensitive along an axis perpendicular to the plane of the resonator is also known (for example EP-A-0 461 761). However, this known resonator exhibits an anisotropy in terms of frequency so that its use remains limited to a gyrometric mode of operation, without it being able to find an application in a gyroscopic mode of operation.

Now, there is at present a demand from users for a plane monolithic mechanical resonator sensitive on a perpendicular axis which is able to operate in gyroscopic mode.

A planar monolithic resonator sensitive along three mutually orthogonal axes, with two axes (X and Y) contained in the plane of the resonator and with the third axis (Z) perpendicular to the plane of the resonator, is also known (GB-A-2 318 184). However, this device exhibits very little sensitivity.

Therefore, there is at present no known planar monolithic resonator sensitive along three mutually orthogonal axes which is correctly isolated and whose signals are easily utilizable, in particular in gyroscopic sensors. In practice, the embodying of a device sensitive along the three reference axes currently calls upon an assemblage of several resonators each sensitive along one or two axes and arranged in appropriate relative spatial positions. This type of setup, to which recourse is made at present out of necessity, proves to be expensive and bulky.

Now, there is at present a pressing demand from certain users for the availability of monolithic sensors sensitive on three orthogonal axes which are as inexpensive as possible, in particular when they are intended for single use (to equip missiles or guided artillery shells for example), and which are of the lowest possible bulk so as to be able to be housed in an environment where the room available is very cramped (for example warhead of a guided shell).

The aim of the invention is therefore essentially to propose an improved structure able to satisfy various practical requirements, while retaining the planar type monolithic structure which is particularly beneficial by reason of the smallness of the devices that it makes it possible to fabricate and the relative simplicity of the fabrication process which permits volume production, or even high-volume production with reliable means leading to geometries of very high accuracy.

The invention is based on the fact that the embodying of inertial sensors able to afford a gyroscopic function requires that the vibrating resonator be isotropic, in particular in terms of frequency and gyroscopic coupling. In a general manner, regardless of the order k of the vibratory mode implemented, the frequency anisotropy as well as the anisotropy of gyroscopic coupling originate from a defect of geometry of the resonator and/or a defect of suspension of the resonator (the resonator is fixed by a more or less complex assembly of interlinked arms limiting the losses of vibratory energy to the outside, but participating in the rigidity of the structure and perturbing the deformation curve of the two modes useful for the gyroscopic function) and/or a defect of material (the materials commonly used to make the planar microstructures are crystalline materials which, by their nature, are anisotropic).

The frequency anisotropy $\Delta f$ can therefore be decomposed into an anisotropy of geometry $\Delta f_g$, an anisotropy of suspension $\Delta f_s$ and an anisotropy of material $\Delta f_m$:

$$\Delta f = \Delta f_g + \Delta f_s + \Delta f_m$$

In order for the frequency anisotropy $\Delta f$ to be zero, it is sufficient for each of the terms $\Delta f_g$, $\Delta f_s$ and $\Delta f_m$ to be zero. The frequency anisotropy will be zero, also, if the algebraic sum of the terms $\Delta f_g$, $\Delta f_s$ and $\Delta f_m$ is zero, that is to say if the algebraic sum of two terms, which individually are non zero, is zero, the third term itself being zero (for example $\Delta f_g + \Delta f_s = 0$ with $\Delta f_g \neq 0$ and $\Delta f_s \neq 0$, and $\Delta f_m = 0$), or else if the algebraic sum of the three terms, which individually are non zero ($\Delta f_g \neq 0$, $\Delta f_s \neq 0$, $\Delta f_m \neq 0$), is zero.

In the same way, the anisotropy of gyroscopic coupling $\Delta\alpha$ can be decomposed into an anisotropy of geometry $\Delta\alpha_g$, an anisotropy of suspension $\Delta\alpha_s$ and an anisotropy of material $\Delta\alpha_m$:

$$\Delta\alpha = \Delta\alpha_g + \Delta\alpha_s + \Delta\alpha_m$$

In order for the anisotropy of gyroscopic coupling $\Delta\alpha$ to be zero, it is sufficient for each of the terms $\Delta\alpha_g$, $\Delta\alpha_s$ and $\Delta\alpha_m$ to be zero. The anisotropy of gyroscopic coupling $\Delta\alpha$ will be zero, also, if the algebraic sum of the terms $\Delta\alpha_g$, $\Delta\alpha_s$ and $\Delta\alpha_m$, at least some of which are not zero, is zero.

The present invention is based on these constraints so as to propose a sensor able to afford not only a gyrometric function, but also a gyroscopic function (basically zero anisotropy: $\Delta f = 0$, that is to say $\Delta f_g = \Delta f_s = \Delta f_m = 0$ or $\Delta f_g + \Delta f_s + \Delta f_m = 0$, and $\Delta\alpha = 0$, that is to say $\Delta\alpha_g = \Delta\alpha_s = \Delta\alpha_m = 0$ or $\Delta\alpha_g + \Delta\alpha_s + \Delta\alpha_m = 0$).

For these purposes, the invention proposes a mechanical resonator with plane monolithic vibrating structure extending along a closed contour whose sensitivity axis is substantially perpendicular to the plane of said structure, which resonator, being devised in accordance with the invention, is characterized in that the plane structure is convex regular polygonal with 4k vertices (k being the order of the vibratory mode implemented when the resonator is set vibrating) and is suspended from a fixed mount by way of n suspension arms of substantially radial extension which are arranged substantially symmetrically.

In a first preferred embodiment, the convex regular polygonal vibrating structure with 4k vertices possesses identical patterns which repeat with angular intervals of $\pi/2k$, by virtue of which said polygonal vibrating structure exhibits an isotropy of geometry ($\Delta f_g = 0$, $\Delta\alpha_g = 0$).

Thus, by virtue of the arrangements of the invention, a vibrating structure is defined which is completely invariant under rotation about a transverse axis (Z axis) for the vibratory mode of order k: the convex regular polygon with 4k vertices having an angular spacing of $\pi/2k$ is invariant for the vibratory mode of order k. Such a resonator exhibits no defect of geometry of orders k−1 and k+1, so that this structure is naturally balanced (insensitivity to external vibratory perturbations). Thus, for k=2, the polygon is a regular octagon which constitutes a plane structure, sensitive to rotations about the transverse central axis (Z axis), geometrically balanced and isotropic in terms of geometry, behaving like a ring resonator.

A new family of plane resonators is thus defined, their deformation curves being contained substantially in the plane of the resonator: the sensitive axis of such a resonator is therefore orthogonal to the plane of the closed structure.

As far now as the anisotropy of material is concerned, the anisotropies of frequency and of gyroscopic coupling are zero if the constituent material of the resonator is naturally isotropic. Now, the crystalline materials commonly used in this field by reason of their qualities (possibility of micromachining by chemical etching, reduced internal losses and therefore high Q factors)—namely quartz and silicon—are anisotropic, except for orders k of certain detected vibratory modes, which are specific in correlation with the symmetry of the crystalline material and for which this material proves to be isotropic and with the angle of cut of the wafer.

Under these conditions, according to another preferred embodiment, for a vibratory mode of order 2 (k=2), the plane resonating structure is of octagonal shape and must be made of a crystalline material with trigonal structure, in particular quartz, with a cut made in the OXY plane, by virtue of which the vibrating structure exhibits an isotropy of material ($\Delta f_m=0$, $\Delta \alpha_m=0$) for order k=2.

Likewise, for a vibratory mode of order 3 (k=3), the plane resonating structure is of dodecagonal shape and must be made of a crystalline material with cubic structure, in particular silicon, with a cutting plane containing the OZ axis, or the OX axis, or the OY axis, by virtue of which the vibrating structure exhibits an isotropy of material ($\Delta f_m=0$, $\Delta \alpha_m=0$) for order k=3.

In another preferred embodiment, provision is made for the suspension arms to be n=4k in number and to be angularly spaced by an angular interval of $\pi/2k$, by virtue of which the vibrating structure exhibits an isotropy of suspension ($\Delta f_s=0$, $\Delta \alpha_s=0$).

According to yet another most particularly preferred embodiment, if the resonator is devised in accordance with the invention with a resonating structure simultaneously exhibiting an isotropy of geometry ($\Delta f_s=0$, $\Delta \alpha_s=0$) and an isotropy of material ($\Delta f_m=0$, $\Delta \alpha_m$ 0) and an isotropy of suspension ($\Delta f_s=0$, $\Delta \alpha_s=0$) in accordance with the arrangements set forth hereinabove, then this resonator is completely isotropic in terms of frequency and coupling coefficient and it is able to operate not only in gyrometric mode, but also in gyroscopic mode. Such a resonator therefore complies with some of the requests of the users.

However, it is also possible to compensate for anisotropy due to the material by introducing a localized modification of the geometry of the resonator (anisotropy of geometry) and/or of the suspension (anisotropy of suspension) in such a way that the deliberately introduced anisotropy (geometry and/or suspension) compensates for the natural anisotropy of the crystalline material used. Thus, according to a preferred embodiment, the polygonal vibrating structure with 4k vertices is made of a crystalline material with non trigonal structure for k=2 or non cubic structure for k=3, and therefore exhibits basically an anisotropy of material ($\Delta f_m \neq 0$, $\Delta \alpha_m \neq 0$). Said polygonal vibrating structure is then, in accordance with the invention, devised so as furthermore to exhibit at least one localized modification of geometry and/or the suspension exhibits at least one localized modification, so that said polygonal vibrating structure exhibits an anisotropy of geometry ($\Delta f_g \neq 0$, $\Delta \alpha_g \neq 0$) and/or an anisotropy of suspension ($\Delta f_s \neq 0$, $\Delta \alpha_s \neq 0$), respectively, able to compensate for the anisotropy of material, by virtue of which said polygonal vibrating structure exhibits an isotropy in terms of frequency ($\Delta f=0$) and coupling ($\Delta \alpha=0$) and the resonator is able to operate in gyrometric mode or in gyroscopic mode. Such a resonator also complies with some of the requests of the users.

For example it is possible for a resonator according to the invention made of silicon and operating at order k=2 to be rendered isotropic by adding four identical masses uniformly distributed and/or by modifying the stiffness of the arms.

Likewise, it is possible for a quartz resonator made according to the invention and operating at order k=3 to be rendered isotropic by adding six identical masses uniformly distributed and/or by modifying the stiffness of the arms.

Likewise, it is possible for the number of suspension arms to be chosen to be different (lower) from the number advocated above (n=4k) in order to obtain isotropy of suspension: the reason may for example be due to insufficient free space to receive n=4k suspension arms (n=8 suspension arms if k=2 and n=12 suspension arms if k=3), in particular in the case of miniaturized gyroscopic devices that are tending to be developed at present.

Under these conditions, according to another preferred embodiment, the suspension arms are n<4k in number and are angularly spaced by an angular interval of $2\pi/n$, with n chosen such that $n \leq k-2$ or $n \geq k+2$ with $n \neq pk$ (p integer), the polygonal vibrating structure therefore exhibiting basically an anisotropy of suspension ($\Delta f_s \neq 0$, $\Delta \alpha_s \neq 0$). Said polygonal vibrating structure is then devised, in accordance with the invention, so as to furthermore exhibit localized defects of geometry which are angularly offset by an angular value of $\pi/k$ and are able to cause a defect of mass of order 2k which engenders an anisotropy in terms of geometry ($\Delta f_g \neq 0$, $\Delta \alpha_g \neq 0$) able to compensate for the anisotropy of suspension due to the insufficient number of suspension arms, by virtue of which said polygonal vibrating structure exhibits an isotropy in terms of frequency ($\Delta f=0$) and coupling ($\Delta \alpha=0$) and the resonator is able to operate in gyrometric mode or in gyroscopic mode thus complying with some expectations of the users.

It will be noted that if n=pk, the resonator exhibits an anisotropy of suspension, while being naturally balanced.

In this case, the compensation will be more effective if the localized defects of geometry (in particular addition of masses) are situated at least in the vicinity of where the suspension arms are linked to or built into the vibrating structure.

In the case where a resonator made in accordance with the invention according to certain of the foregoing arrangements exhibits at least one anisotropy of geometry ($\Delta f_g \neq 0$, $\Delta \alpha_g \neq 0$), or at least one anisotropy of material ($\Delta f_m \neq 0$, $\Delta \alpha_m \neq 0$), or at least one anisotropy of suspension ($\Delta f_s \neq 0$, $\Delta \alpha_s \neq 0$), then this resonator is not completely isotropic in terms of frequency and/or coupling coefficient and it is able to operate only in gyrometric mode, without being able to be utilized in gyroscopic mode.

As far as the suspension of the vibrating structure is concerned and regardless of the solution adopted on the basis of the aforesaid solutions, it is possible to contrive matters such that the mount surrounds the plane vibrating structure and such that the suspension arms are outside the vibrating structure; or indeed also that the mount has a central hub substantially concentric with the vibrating structure and that the suspension arms are inside the vibrating structure. However, in the case where the number of arms is equal to 4k, or close to this value, the space occupied by the arms is all the larger the higher the order k, thereby leaving little possibility for optimizing the stiffness of the arms making it possible to obtain, in the case of small imbalances, mechanical decoupling with the point of attachment, most particularly in the case of the central hub with the arms inside the vibrating structure with closed contour. From this point of view, and in particular for resonators with central hub, it will be beneficial to favor the modes of low order, in particular k=2, so that the product 4k is small.

In addition to the aforesaid advantages achieved by virtue of the implementation of a monolithic mechanical resonator of planar type sensitive along a transverse axis (Z axis) in accordance with the invention, an additional advantage resides in the possibility of functionally combining such a resonator in accordance with the invention with a resonator of planar type sensitive along an axis (X or Y) or along two axes (X, Y) contained in the plane of the vibrating structure in such a way as to obtain a plane monolithic resonator sensitive along two axes (X, Z or Y, Z) or along three axes (X, Y, Z). In particular, it is possible to envisage that the mechanical resonator devised as indicated in the above paragraph be combined with a mechanical resonator having resonating beams which are carried by a central hub substantially concentric with the vibrating structure with closed contour and which radiate around said central hub substantially in the plane of the vibrating structure with closed contour, such as the resonating-beams resonator described in the aforesaid document FR-A-2 741 150, by virtue of which the gyrometric or gyroscopic device has all its vibrating elements situated substantially in one and the same plane (possibility of monolithic embodiment) and is able to detect the three components Ωx, Ωy and Ωz of a rate of rotation Ω imparted to the mount, the components Ωx and Ωy being detected by the resonating beams and the component Ωz being detected by the vibrating structure with closed contour.

Thus, by virtue of the arrangements in accordance with the invention, it is possible, by appropriately choosing the parameters of the resonators, to make a plane monolithic resonator capable of providing measurements on three mutually orthogonal axes, the axes (X, Y) situated in the plane of the resonator being limited to the gyrometric mode of operation and the orthogonal axis (Z) giving access to the gyroscopic mode of operation. Other requests of the users are thus complied with, within the framework of the present invention.

In a yet more general manner, the monolithic resonator of planar type in accordance with the invention can be integrated into a plane monolithic structure of much vaster application grouping together a plurality of plane sensors of various types, not only gyrometric and/or gyroscopic sensors, but also pressure sensors, temperature sensors, etc. In particular, the invention makes it possible to embody a plane integrated monolithic structure, able to afford a function of accelerometric detection with respect to three orthogonal axes and a function of gyroscopic detection with respect to three orthogonal axes, such a structure constituting a core of an integrated monolithic inertial platform of planar type.

Figure 1B:
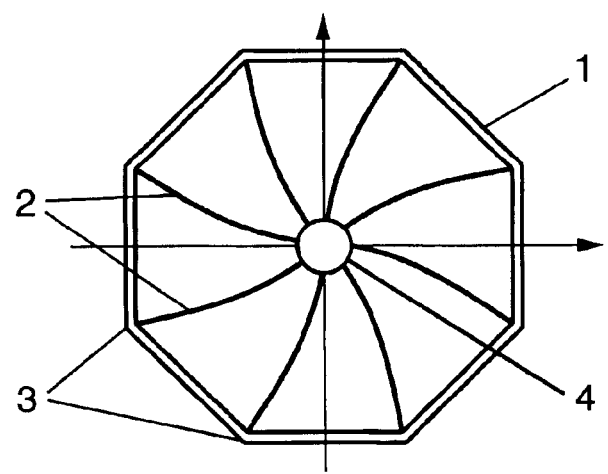
Figure 1C:
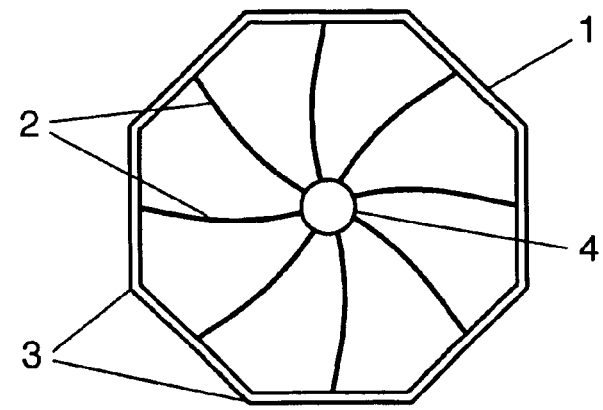
Figure 2A:
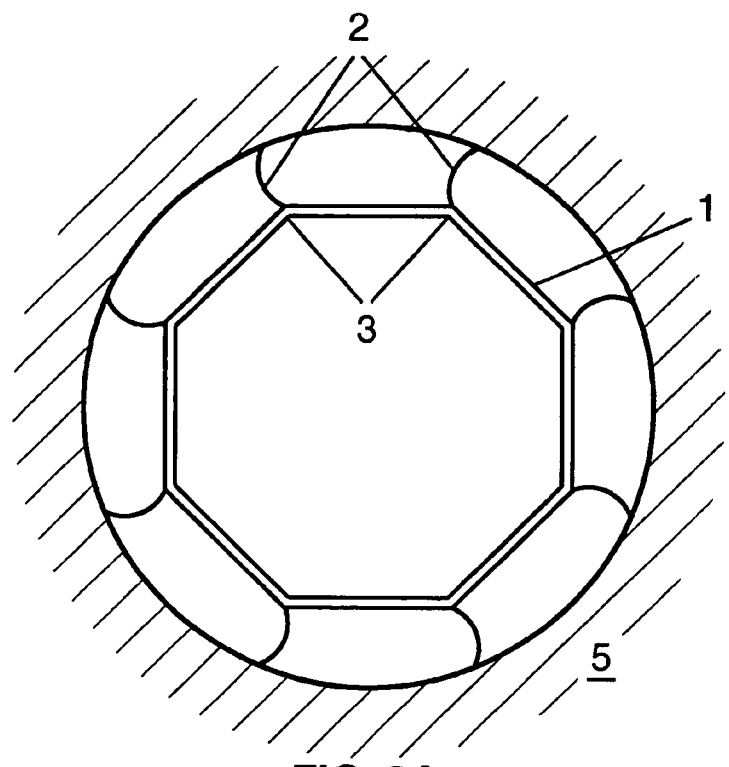
Figure 2B:
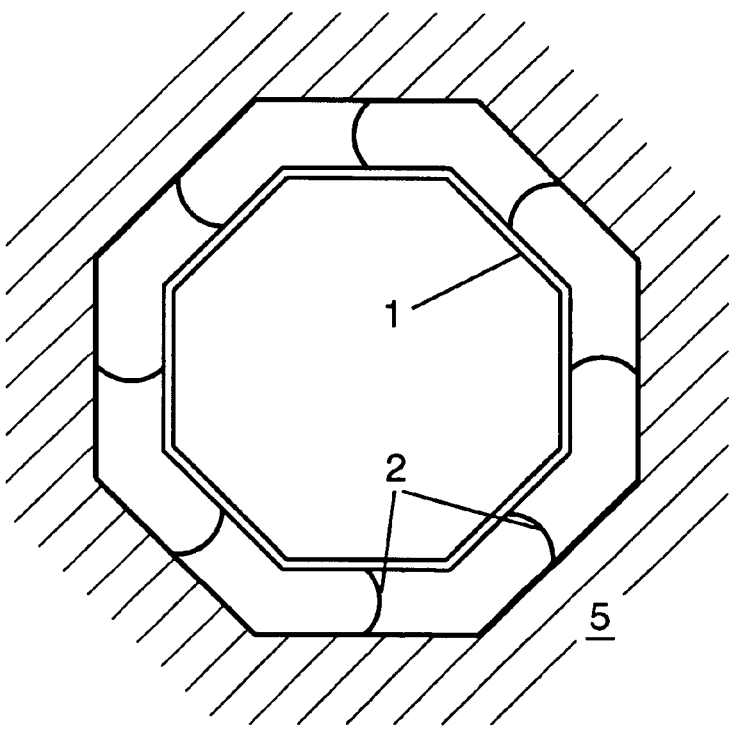
Figure 4A:
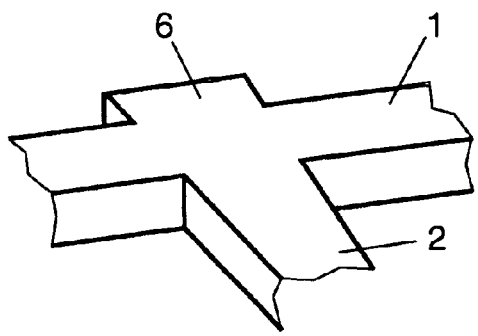
Figure 4B:
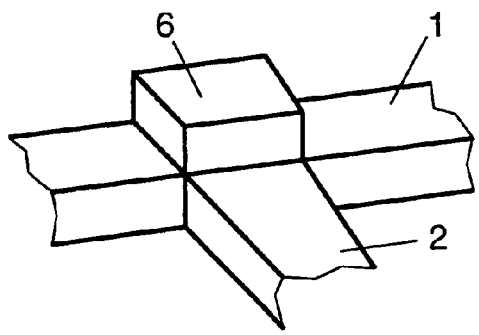
Figure 5A:
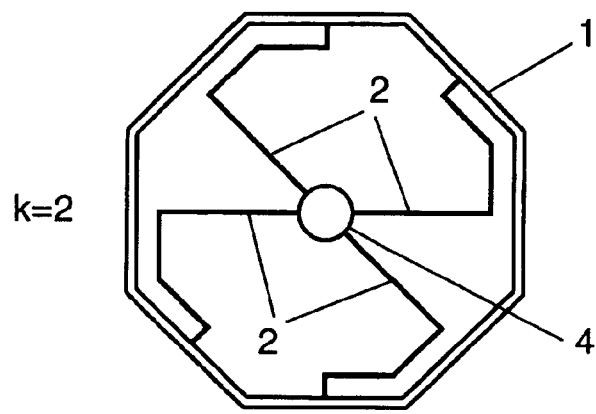
Figure 5B:
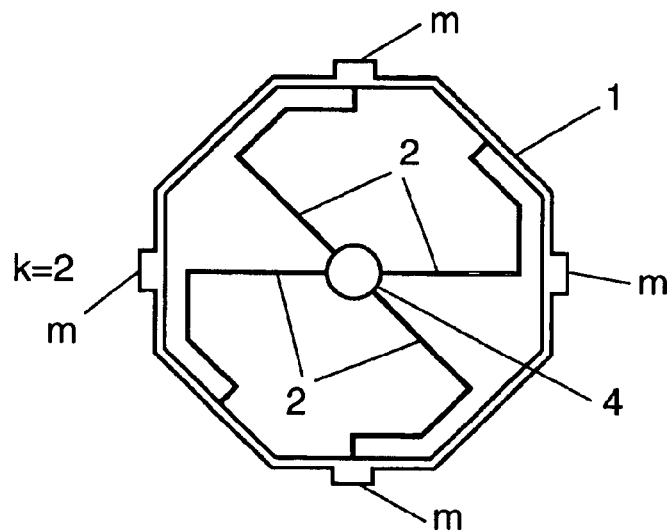
Figure 5C:
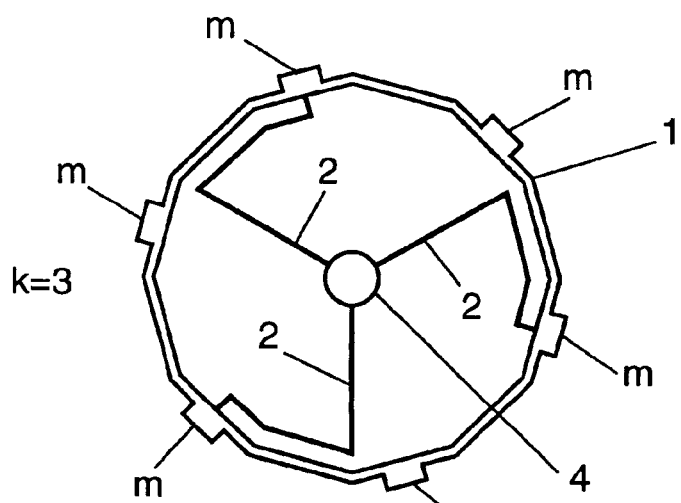
Figure 6A:
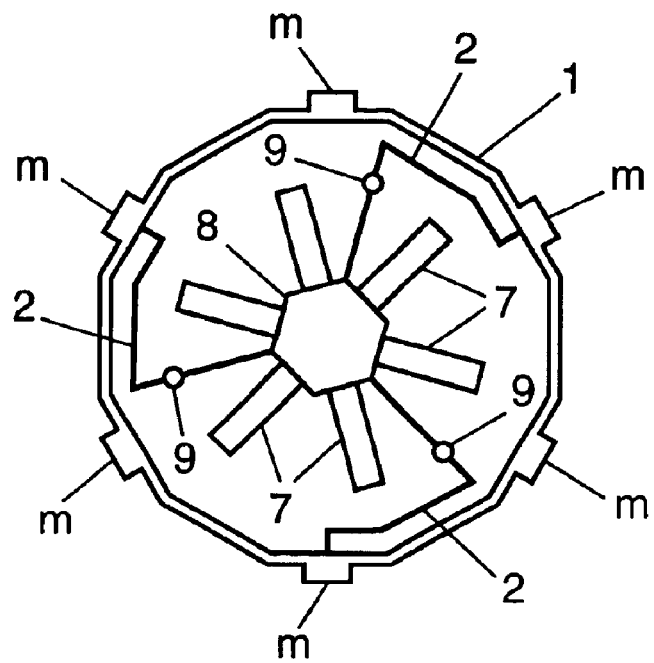
Figure 6B:
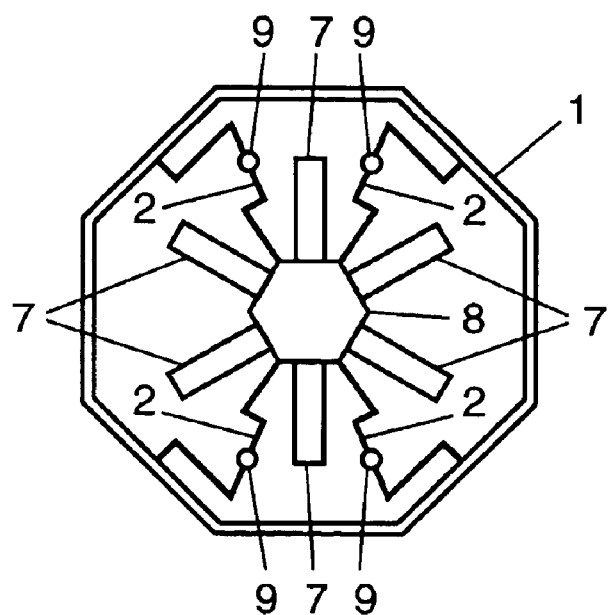
Figure 7:
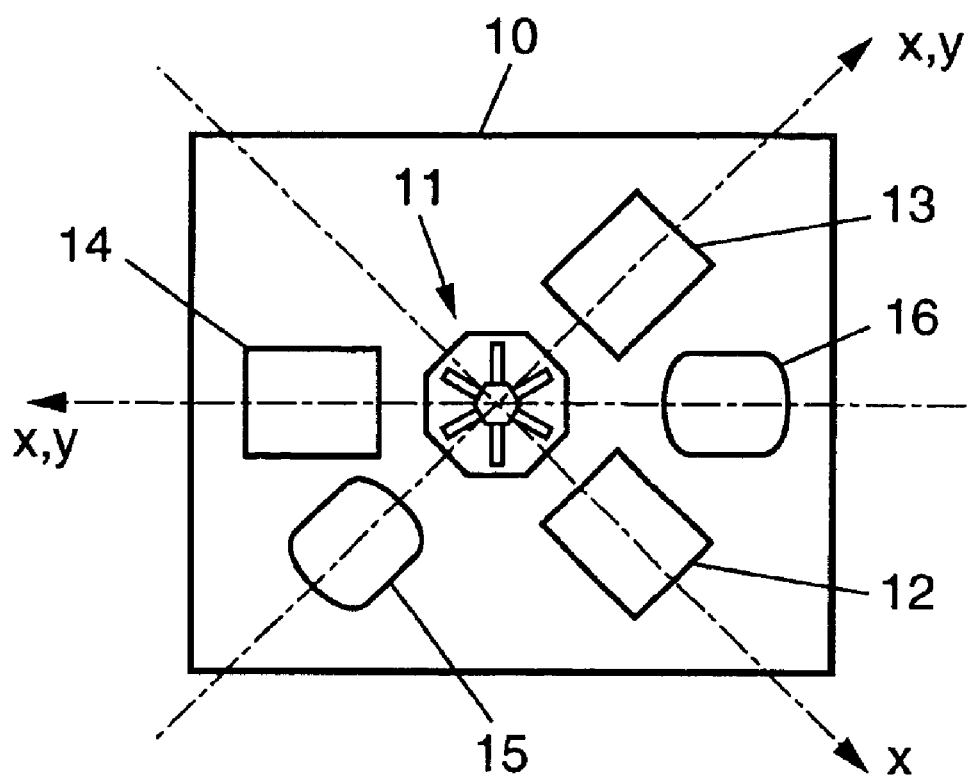

The invention will be better understood on reading the detailed description which follows of certain preferred embodiments given merely by way of nonlimiting example. In this description, reference will be made to the appended figures in which:

FIGS. 1A to 1C respectively diagrammatically illustrate three possible variant embodiments of a resonator with closed polygonal contour isotropic in terms of geometry and with inside suspension, in accordance with the invention;

FIGS. 2A and 2B respectively diagrammatically illustrate two possible variant embodiments of a resonator with closed polygonal contour isotropic in terms of geometry and with outside suspension, in accordance with the invention;

FIGS. 3A to 3F diagrammatically illustrate alternative possible variant embodiments of a resonator with closed polygonal contour isotropic in terms of suspension or whose anisotropy in terms of suspension is compensated for by outside means, in accordance with the invention;

FIGS. 4A and 4B diagrammatically illustrate two variant layouts of extra masses in a resonator with closed polygonal contour, in accordance with the invention;

FIGS. 5A to 5C diagrammatically illustrate three possible variant embodiments of a resonator with closed polygonal contour isotropic in terms of material or compensated so as to be rendered isotropic, in accordance with the invention;

FIGS. 6A and 6B diagrammatically illustrate two exemplary embodiments of a plane resonator sensitive along three orthogonal axes, in accordance with the invention; and FIG. 7 is a diagrammatic view from above of a plane, monolithic, inertial sensor which is gyro-accelerometric in terms of X, Y and Z incorporating an accelerometric resonator sensitive along the transverse axis Z in accordance with the invention.

It will firstly be recalled that, as set forth hereinabove, regardless of the order k of the vibratory modes used, it is in general possible to decompose the anisotropy of frequency as well as the anisotropy of coupling coefficient of the mechanical resonator into three terms:

$$\Delta f = \Delta f_m + \Delta f_g + \Delta f_s \text{ and } \Delta\alpha = \Delta\alpha_m + \Delta\alpha_g + \Delta\alpha_s$$

where the indices m, g and s indicate as origin of the defect the material, the geometry and the suspension of the resonator. Thus, in order for the anisotropies $\Delta f$ and $\Delta\alpha$ to be zero, it is sufficient for each of the terms of these two relations to be zero or for the algebraic sums $\Delta f_m + \Delta f_g + \Delta f_s$ and $\Delta\alpha_m + \Delta\alpha_g + \Delta\alpha_s$ to be zero.

Moreover, as far as the mechanical balance conditions are concerned, it is established that, for the modes of order k, the defects of order k−1 and k+1 create a sensitivity to the transverse excitations and the defects or order k create a sensitivity to the axial angular accelerations. However, for the usual operational environments, the error introduced by the axial angular accelerations is negligible in so far as these angular accelerations are small as compared with the linear accelerations and are weighted by the small dimensions of the resonators. Under these conditions, the defects of order k need not be taken into consideration.

These features constitute the basis for the design of the mechanical resonator in accordance with the invention, according to the schemes which follow which are set forth in succession in relation to the geometry, to the suspension and to the choice of material (and of its cutting plane) of the mechanical resonator of the invention.

In accordance with the invention, a mechanical resonator with plane monolithic vibrating structure extending along a closed contour whose sensitivity axis is substantially perpendicular to the plane of said structure, is such that the plane structure is convex regular polygonal with 4k vertices (k being the order of the vibratory mode implemented when the resonator is set vibrating) and is suspended from a fixed mount by way of n suspension arms of substantially radial extent which are arranged substantially symmetrically.

As far firstly as the geometry of the resonator is concerned, the obtaining of complete isotropy of geometry of the resonator (that is to say of an anisotropy of geometry which is zero: $\Delta f_g=0$ and $\Delta\alpha_g=0$) is the result of the implementation of the abovesaid plane polygonal vibrating structure with 4k vertices, totally invariant under rotation about a transverse central axis orthogonal to the plane of the structure (Z axis), in which the same pattern repeats with an angular offset of $\pi/2k$. A mechanical resonator having such a shape exhibits no defect of order k−1, k+1 and k.

For example, in the relatively common case of a mechanical resonator utilized in the mode of order 2 (k=2), the resonator is isotropic in terms of geometry if it has the shape of a plane regular octagon and it is sensitive to rotations about the transverse central axis (Z axis): such a resonator behaves as a ring resonator, it being known that the latter is intrinsically isotropic in terms of geometry.

In the same way, in the likewise common case of a mechanical resonator utilized in the mode of order k (k=3), the resonator is isotropic in terms of geometry if it has the shape of a regular dodecagon.

On the other hand, a resonator of square shape which is encountered in the state of the art cannot exhibit an anisotropy in terms of geometry which is zero and cannot therefore comply with the requirements expressed within the framework of the present invention.

Thus, the invention leads to a new family of plane mechanical resonators whose deformation curves are contained in the plane of the resonator: these are mechanical resonators in the shape of convex regular polygons having 4k vertices for k≧2, for which the sensitive axis (Z axis) is orthogonal to the plane of the resonator.

As far now as the suspension of the mechanical resonator is concerned, the sought-after suspension must be flexible enough to fulfil a filtering role with regard to the vibrations transmitted to the point of attachment of the resonator when the latter exhibits an imbalance, for example owing to machining inaccuracies. Conversely, this device must not be too flexible so that the resonant modes are not too low in terms of frequency and can be excited by the operational environment of the sensor.

The most natural device which complies with these requirements calls upon several suspension arms, n=4k in number. These arms are all identical, uniformly distributed with angular intervals of $\pi/2k$; they are linked, on one side, to the resonator and, on the other side, to a fixed point of attachment secured to a mount or outside box. In this latter case, the point of attachment may be situated centrally to the resonator (central pivot or central hub), the suspension arms then extending inside the closed contour of the resonator, or else the point of attachment is situated outside the resonator (for example mount surrounding the resonator), the suspension arms then extending outside the closed contour of the resonator.

Regardless of the solution adopted, the arms have a general radial extension, it being accepted that their exact shape deviates from a simple straight ray and may exhibit a complex configuration so that the aforesaid characteristics in particular of filtering and of stiffness can be combined. Those skilled in the art are aware of various configuration suitable for satisfying these demands.

In the case in accordance with the invention where the resonator is regular convex polygonal with 4k vertices and 4k suspension arms, the fixing points are situated precisely where the residual vibrations are small enough, that is to say at the vertices or in the middles of the sides of the polygonal structure.

Such a device exhibits no defect of order k−1, k+1 and k.

To fix matters, FIG. 1A illustrates, by way of example, a mechanical resonator with vibrating structure 1 of octagonal regular convex polygonal shape (for k=2), furnished with eight suspension arms 2 situated inside and extending between the vertices 3 of the octagonal structure 1 and a central hub (or pivot) 4. In order for the suspension to exhibit the required flexibility, the arms 2, although of approximately radial general extension, posses an approximately Z-shaped form.

In FIG. 1B, the octagonal resonator with vibrating structure 1 is suspended with the aid of eight inside arms 2 which exhibit an almost straight radial extension, while being however, slightly inwardly curved so as not to confer too high a stiffness (effect of mechanical filtering of the vibrations to which the mount may be subjected).

The Z-shaped arms of the resonator of FIG. 1A, which confer higher flexibility, may have a larger cross section than the arms of FIG. 1B which, so as not to stiffen the outer frame 1, must be slender. This point will be particularly important for the embodying of the conducting tracks linking the excitation and detection electrodes situated on the resonator to the signal processing electronics. However, the number of arms being equal to 4k and hence relatively high, the space occupied by these arms is necessarily considerable, and is all the more so the higher the order of the modes, thereby leaving little possibility for optimizing the stiffness of these arms. From this point of view, modes of low order, for example of order 2, will be favored so that the product 4k, and hence the number of arms, is small.

Of course, as indicated above, the arms 2 may be tied to the polygonal structure at the middles of the sides as illustrated by way of example in FIG. 1C rather than on the vertices of the structure, as illustrated in FIGS. 1A and 1B.

Likewise, the suspension arms may be outside the polygonal structure, as illustrated by way of example in FIGS. 2A and 2B, being interposed between the polygonal vibrating structure 1 and a mount 5 surrounding the vibrating structure 1, said mount 5 possibly being in particular circular (FIG. 2A, with for example the arms 2 departing from the vertices of the vibrating structure 1) or polygonal (FIG. 2B, with for example the arms linking the respective middles of the two concentric polygonal contours).

As far finally as the constituent material of the mechanical resonator is concerned, the anisotropies of frequency and of gyroscopic coupling will be zero if the material used is naturally isotropic. Now, silicon crystals and quartz crystals, owing to their crystalline nature, are anisotropic. This is a considerable problem since these two crystalline materials lend themselves naturally to micro-machining by chemical etching as is effected with the collective methods of microelectronics. Moreover, these crystalline materials possess numerous other advantages, such as for example their reduced internal losses and hence their high Q factors, and, for quartz, owing to the piezoelectric character thereof, possibilities of excitation and of detection of the resonant modes.

Consequently, it is not possible to exclude the use of these crystalline materials under the pretext of searching for zero anisotropy in terms of material.

However, for the above-described geometries of resonator in the shape of a ring or convex regular polygon with 4k vertices, other solutions may be found for reducing the magnitude of the anisotropy of material, or even to obtain zero anisotropy.

A solution may be found precisely where the order k of the modes used can combine with the symmetry of the material and with the condition that the crystal cutting plane is correctly chosen. Thus, it is observed that these geometries are isotropic for order 2 in quartz and for order 3 in silicon: this property results from the particular structure of the rigidity matrices of these materials. From a general point of view, as far as the material is concerned, a resonator in the shape of a convex regular polygon with 4k vertices is naturally isotropic in terms of frequency and coupling coefficient for modes of order 2 (resonator of octagonal shape) if the material has a trigonal structure (for example quartz) with a material cutting plane situated in the OXY plane and for modes of order 3 (resonator of dodecagonal shape) if the material has a cubic structure (for example silicon) with a material cutting plane containing the OX axis, or the OY axis, or the OZ axis. The order 2 being less complex to implement than a higher order, a quartz convex regular octagon will preferably be constructed which will then be intrinsically isotropic ($\Delta f_m=0$, $\Delta \alpha_m=0$).

Preferably, it is possible to make a vibrating structure that simultaneously combines the three arrangements just set forth: such a structure then exhibits an isotropy of geometry ($\Delta f_g=0$, $\Delta \alpha_g=0$), and an isotropy of suspension ($\Delta f_s=0$, $\Delta \alpha_s=0$), and an isotropy of material ($\Delta f_m=0$, $\Delta \alpha_m=0$). Being basically completely isotropic ($\Delta f=0$, $\Delta \alpha=0$), this structure is able to operate in gyroscopic mode, as well as in gyrometric mode.

However, the simultaneous obtaining of the three isotropies of geometry, of suspension and of material may prove impossible. In this case, it is conceivable to compensate for an anisotropy of a specific type by deliberately introducing an anisotropy of another type able, through its effects, to compensate for the effects of the first anisotropy mentioned. In this case, if the structure is isotropic for the third type, this structure will then exhibit overall isotropy. For example, if it is anisotropic in terms of suspension ($\Delta f_s \neq 0$, $\Delta \alpha_s \neq 0$), an anisotropy of geometry ($\Delta f_g \neq 0$, $\Delta \alpha_g \neq 0$) can be deliberately introduced such that $\Delta f_s + \Delta \alpha_g = 0$ and $\Delta \alpha_s + \Delta \alpha_g = 0$; if moreover the structure is isotropic in terms of material ($\Delta f_m=0$, $\Delta \alpha_m=0$), one actually obtains $\Delta f=0$, $\Delta \alpha=0$; the structure is isotropic and can be used in gyroscopic mode.

Specific examples will now be given.

To remedy the difficulties of installing the number of arms required to obtain the isotropy of suspension, in particular in the case of inside arms (lack of available room), one may be induced to search for other possibilities for which the number of arms is less than 4k. However, the suspension arms then introduce a defect whose order, if it is poorly chosen, may inappropriately coincide with a defect of anisotropy of frequency, if the order of the defect is an integer multiple of k, or with a defect of mechanical isolation, if the order of the defect is equal to k±1.

When the arms are n less than 4k (n<4k) in number and are separated by angular intervals of $2\pi/n$, a defect of stiffness of order n is introduced. Whereupon, the acceptable cases correspond to $n \leq k-2$ and $n \geq k+2$ with $n \neq pk$, where p is an integer (p ∈ N), or else n=pk. In the latter case, the anisotropy of frequency which appears may easily be compensated for by deliberately introducing a mass defect of order 2k: the quantity $\sqrt{k/m}$, dimensionally equivalent to a frequency, is then kept constant over the closed contour by adding identical masses m every $\pi/k$, with a maximum of masses placed in the vicinity of where the arms are built into the resonator. Compensation through a mass defect of order k (removal of material) would also have been conceivable, but in this case the sensitivity of the resonator to angular accelerations along its sensitive axis would increase: this solution is therefore discarded.

Figure 3A:
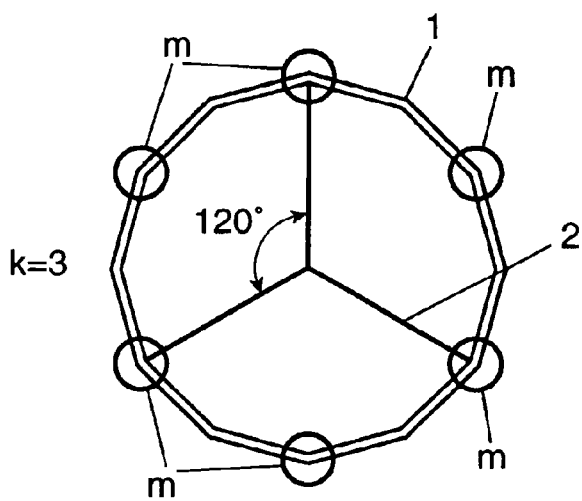

By way of example, a device with three identical arms distributed every 120° is isotropic in terms of frequency and does not unbalance the resonator if the mode used is of order 1 or 5. On the other hand, for operation of the device in a mode of order 3 (k=3) leading to a dodecagonal structure, it is necessary, in order to preserve the isotropy, to make provision for the addition of three masses m where the arms 2 are built into the vibrating structure 1 and three additional masses m mid-way between two successive built-in points, the masses being separated angularly by $\pi/3$ (FIG. 3A).

Figure 3B:
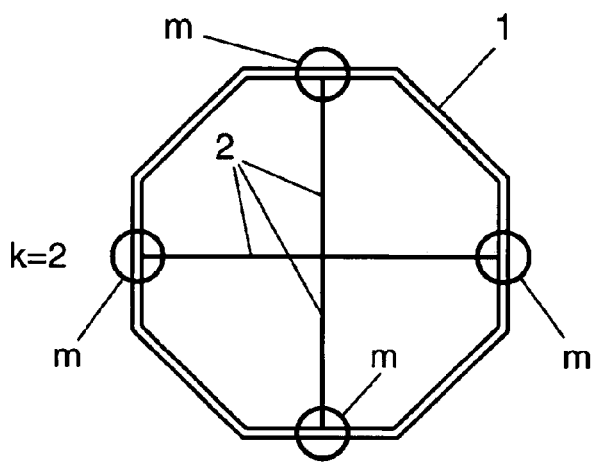
Figure 3C:
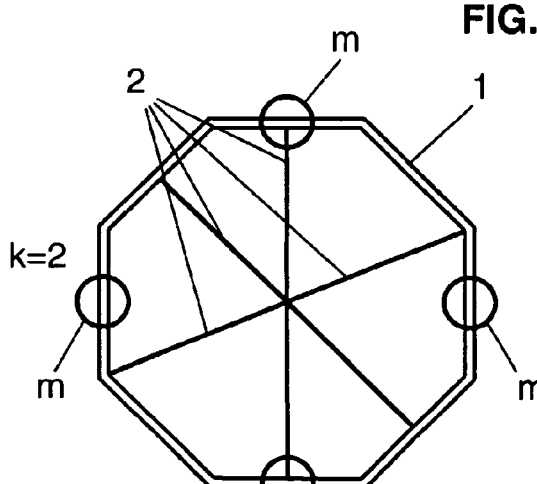
Figure 3D:
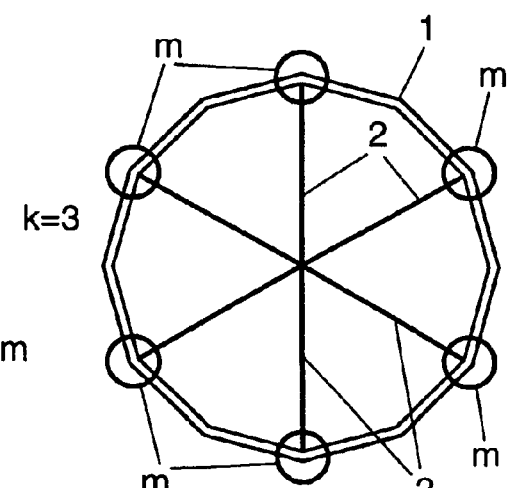
Figure 3E:
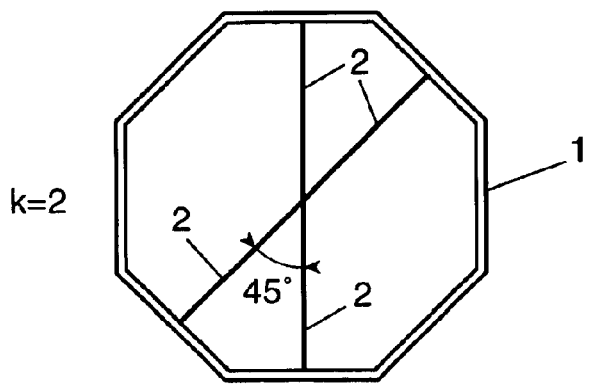
Figure 3F:
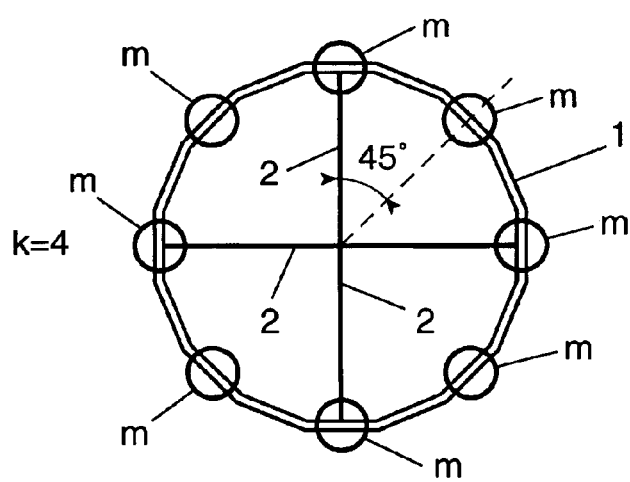

Likewise, a device with four identical arms distributed every 90° is isotropic in terms of frequency and does not unbalance the resonator if the mode used is of order 6. However for an order 2 (octagonal structure), it is necessary to make provision for four masses m added at the points where the arms are built in (FIG. 3B). For k=4 (polygonal structure with 16 sides), it is furthermore necessary to make provision for four additional masses m shifted by 45° with respect to the masses m at the built-in points (FIG. 3F).

Still by way of example, a device with six identical arms distributed every 60° is isotropic in terms of frequency and does not unbalance the resonator if the mode used is of order 4. However, to operate in a mode of order 2 (octagonal structure), four masses m must be added every 90° (FIG. 3C); for order 3 (dodecagonal structure), six masses m must be added to the points where the arms are built in every 60° (FIG. 3D).

If now the number n of arms is less than 4k while these arms make an angle different from $2\pi/n$ between themselves, the defect introduced is a defect of stiffness having all the harmonics 1, 2, 3 etc. In this case, the solutions have to be studied on a case by case basis according to the order of the mode used. Thus, for k=2 (octagonal structure), a solution consists in creating a defect of stiffness of harmonic 2 and 4, these two defects cancelling one another out from the standpoint of the anisotropy of frequency. Four arms are arranged at 45°–135° for this purpose (FIG. 3E). For k=4 (not illustrated), the same configuration with four arms may also be apt.

From a practical point of view, the addition of mass is obtained by making provision, on the closed polygonal structure, for a protuberance or projection 6 which can either be radial (FIG. 4A), or axial or stair-shaped (FIG. 4B). The choice is made as a function of the room available radially or axially. The construction of such protuberances may easily be integrated into the configuration of the resonator and is in no way adverse to the conduct of the fabrication process (chemical etching, laser etching, etc.).

To summarize, the suspensions with three or four arms are isotropic and satisfy the mechanical balance of the structure. These suspensions may be applied with advantage to resonators in the shape of a convex regular polygon with 4k vertices. In particular, the modes of order 2 are suitable for a four-arm suspension, and the modes of order 3 are suitable for a three-arm suspension according to the form illustrated in FIG. 3A.

Likewise, it is possible to search for compensation for the anisotropies of the material by deliberately introducing an anisotropy of geometry and/or of suspension, for example by locally modifying the shape of the polygonal resonator and/or of the suspension arms (the latter arrangement being prompted by the remarks already made hereinabove regarding the suspensions), in such a way that the anisotropy of geometry and/or of suspension acts in such a manner as to compensate for the anisotropy of material.

Stated otherwise, the polygonal vibrating structure with 4k vertices is made of a crystalline material with non trigonal structure for k=2 or non cubic structure for k=3, and therefore basically exhibits an anisotropy of material ($\Delta f_m \neq 0$, $\Delta \alpha_m \neq 0$). Said polygonal vibrating structure is devised to furthermore exhibit at least one localized modification of geometry and/or the suspension exhibits at least one localized modification, so that said polygonal vibrating structure exhibits an anisotropy of geometry ($\Delta f_g \neq 0$, $\Delta \alpha_g \neq 0$) and/or an anisotropy of suspension ($\Delta f_s \neq 0$, $\Delta \alpha_s \neq 0$), respectively, able to compensate for the anisotropy of material, by virtue of which said polygonal vibrating structure exhibits an isotropy in terms of frequency ($\Delta f=0$) and coupling ($\Delta \alpha=0$) and the resonator is able to operate in gyrometric mode or in gyroscopic mode.

For example, it is thus possible for a silicon resonator having the geometry required according to the invention and operating at order 2 to be rendered isotropic by adding four identical masses and/or by modifying the stiffness of the arms, as indicated hereinabove in this regard. Likewise, it is also possible for a quartz resonator shaped geometrically according to the invention and operating at order 3 to be made to operate by adding six identical masses and/or by modifying the stiffness of the arms, as indicated hereinabove.

Illustrated in FIGS. 5A to 5C are a few exemplary implementations of the arrangements of the invention which have just been set forth.

In FIG. 5A, the resonator 1 having to operate in the mode of order 2 (octagonal structure) is made of quartz and the suspension is made of four approximately Z-shaped arms 2 extending between a central hub 4 and the middles of four respective pairwise opposite and adjacent sides, thereby conferring an anisotropy of stiffness of orders 2 and 4 compensating for the insufficient number of arms.

In FIG. 5B, the same resonator 1, with the same arms 2 arranged according to the same layout, is made of silicon while it operates in the mode of order 2 (octagonal structure). To compensate for the anisotropy of material, an anisotropy of mass of order 4 is introduced by adding four masses m mutually offset by 90°, with two masses arranged at the points where two opposite arms are built in (in the middle of the corresponding sides of the octagon) and of two masses arranged in the respective middles of the two sides perpendicular to the previous ones.

Illustrated in FIG. 5C is a dodecagonal resonator (k=3) furnished with just three Z-shaped arms 2 which are built in at the middle of one side out of four. Six regularly distributed masses m are added in the middle of one side out of two, three of them being arranged where the arms are built in. The resonator can equally well be made of silicon or quartz, the masses m introducing an anisotropy in terms of mass compensating for the anisotropy of suspension (insufficient number of arms) if the resonator is made of silicon and compensating for the anisotropy of suspension as well as the anisotropy of material if the resonator is made of quartz.

By virtue of the arrangements just set forth, it is possible to design a plane polygonal resonator which, although exhibiting at least one anisotropy of geometry, or one anisotropy of suspension, or one anisotropy of material, can be compensated so as to be rendered isotropic ($\Delta f=0$, $\Delta \alpha=0$). Such a resonator is able to operate equally well in gyroscopic mode as in gyrometric mode, in the same way as an intrinsically isotropic resonator as conceived hereinabove. The requirement of users needing a plane gyroscopic device sensitive along a transverse axis (OZ) is thus met.

The plane resonator in accordance with the invention affords the additional advantage, inherent in its plane structure transverse to its sensitivity axis, of being able to be combined with one or more other vibrating structures whose sensitivity axis or axes are situated in this same plane, it being possible to fabricate the assembly in one and the same substrate in the guise of a monolithic plane device sensitive along three mutually orthogonal axes.

A most particularly beneficial example provides the plane resonator of the invention, sensitive along a transverse axis, also with resonating beams 7 that are carried by a central hub 8 substantially concentric with the polygonal vibrating structure 1 of the invention (which is illustrated in FIG. 6A in the form of a dodecagonal polygon with three Z-shaped suspension arms 2, with six compensatory masses m, in accordance with the arrangements set forth in regard to FIG. 5C). The six resonating beams 7 radiate regularly about the central hub 8 while being situated substantially in the plane of the polygonal structure 1. The fixing of the dodecagonal polygonal structure 1 by three arms 2 arranged at 120° with respect to one another is the one which is most suitable in order for these arms to be inserted between the resonating beams 7 while being secured to the central hub 8. The resonating structure 1, operating in the mode of order 3, can either be constructed from silicon or quartz, silicon exhibiting, however, the benefit of not introducing any anisotropy of frequency.

The fixing of the assembly onto a fixed mount is performed at 9 on each suspension arm 2.

The vibrating structure with six radiating beams secured to an outside polygonal fixed mount is known from document FR-A-2 741 151 and constitutes a plane mechanical resonator sensitive along two orthogonal axes (X, Y) contained the plane of the structure.

By virtue of the arrangements of the invention, a monolithic, plane mechanical resonator is constructed which is able to detect the three components $\Omega x$, $\Omega y$ and $\Omega z$ of a rate of rotation $\Omega$ imparted to the mount supporting the resonator, the components $\Omega x$ and $\Omega y$ being detected by the resonating beams and the component $\Omega z$ being detected by the ring-shaped or polygonal vibrating structure with closed contour. Thus, the resonator is able to operate in gyrometric mode or in gyroscopic mode on the three mutually orthogonal axes X, Y and Z.

Illustrated in FIG. 6B is another embodiment of a plane resonator with three sensitivity axes able to operate in a mode of order 2 (k=2). In application of the arrangements of the invention, the resonating structure with closed contour 1 is an octagon. The suspension is afforded with the aid of four arms 2 arranged between the outer octagonal resonant structure 1 and the hub 8 of the inner star-like resonating structure 7. The relatively small number of suspension arms 2 is favorable having regard to the scarce room available and makes it possible to decrease the number of electrodes able to sustain and to detect the vibration of the octagonal structure. On the other hand, the star structure 7 is suspended by way of four arms, thereby no longer permitting the ternary symmetry of the embodiment of FIG. 6A.

To ensure the isotropy demands required by the invention, the best solution consists in placing two opposite beams 7 of the star structure on the bisector of the pairs of suspension arms of the outer polygonal structure. Thus, the smallest angle between the star-like beams and the suspension arms of the polygonal structure is 22.5°. By giving the suspension arms a Z-shaped course, it is then possible to tie them to the bisector of two beams, thereby not disturbing the balance of the latter structure. The material used will preferably be quartz, owing to its isotropy in terms of frequency for order k=2.

The fixing of the entire structure to the support mount is optimal with four points of attachment 9 placed on the suspension arms 2, this position making it possible to find the best compromise between, on the one hand, a central fixing for the outer vibrating structure with polygonal contour and, on the other hand, a fixing to the ends of the frame for the star-like inner structure with vibrating beams 7.

One thus obtains a structure sensitive along three measurement axes X, Y and Z, the axes situated in the plane of the cell being limited to the gyrometric mode of operation and the orthogonal axis giving access to the gyroscopic mode of operation.

Of course, the field of application of a resonator in accordance with the invention is not restricted to the embodiment of a single sensor sensitive along three orthogonal axes, and the plane resonator according to the invention opens up the possibility of grouping a multiplicity of sensors of various physical quantities onto one and the same crystalline substrate, silicon or quartz in particular: these quantities certainly include angular variations about axes X, Y and Z, but also acceleration, temperature, pressure, etc. All these sensors may be manufactured on one and the same plane monolithic crystalline substrate, thereby permitting the embodiment of highly compact miniaturized devices able to be fabricated at lesser cost by known techniques of chemical etching, laser etching or the like.

In particular, it becomes possible to fabricate a gyro-accelerometric inertial sensor of plane monolithic type, grouping together on the plane surface of one and the same slice the X-wise, Y-wise and Z-wise gyroscopic sensors and the X-wise, Y-wise and Z-wise accelerometric sensors. Such a layout is illustrated very diagrammatically in FIG. 7. The substrate 10, made of an appropriate crystalline material such as silicon or quartz widely used for such applications, incorporates a plane Z-wise sensitive resonator disposed in accordance with the invention, as well as a plane X-wise and Y-wise sensitive resonator, that is to say one which is sensitive in the plane of the resonator, which may comply with the teachings of document FR-A-2 741 151; more advantageously, these two resonators may be combined as set forth hereinabove with regard in particular to FIGS. 6A and 6B in the form of a plane unitary sensor 11 with X-wise, Y-wise and Z-wise gyroscopic mode of operation.

With this gyroscopic unitary sensor 11 is associated a plane X-wise and Y-wise sensitive accelerometric sensor or two respectively X-wise and Y-wise sensitive accelerometric sensors, at the same time as there is provided a plane accelerometric sensor sensitive along the Z transverse axis. Plane accelerometric sensors such as these are known to the person skilled in the art.

By way of example, it will be possible to implement three monodirectional-sensitivity sensors angularly offset by 120° with respect to one another, one 12 being sensitive along the X-axis and the other two 13, 14 being sensitive X- and Y-wise: a differential processing of the signals from these three sensors makes it possible to obtain the acceleration components $\gamma_x$ and $\gamma_y$. Appropriate sensors may be of the type described in document FR 00 10675.

Likewise, the acceleration component $\gamma_z$ may be known by differential implementation of two sensors 15, 16 which may be of the type described in document FR-A-2 685 964.

What is claimed is:

1. A mechanical resonator with a plane monolithic vibrating structure extending along a closed contour whose sensitivity axis is substantially perpendicular to the plane of said structure,
   wherein the plane structure is a convex regular polygonal with 4k vertices, where k is the order of the vibratory mode implemented when the resonator is set vibrating and $k \geq 2$, and is suspended from a fixed mount by way of n suspension arms of substantially radial extension which are arranged substantially symmetrically.

2. The mechanical resonator as claimed in claim 1, wherein the convex regular polygonal vibrating structure with 4k vertices possesses identical patterns which repeat with angular intervals of $\pi/2k$, whereby said polygonal vibrating structure exhibits and isotropy of geometry ($\Delta f_g = 0$, $\Delta \alpha_g = 0$).

3. The mechanical resonator as claimed in claim 1, wherein, for a vibratory mode of order 2 (k=2), the plane vibrating structure is of octagonal shape and is made of a crystalline material with trigonal structure, with a cut made in the X, Y plane, whereby the vibrating structure exhibits an isotropy of material ($\Delta f_m = 0$, $\Delta \alpha_m = 0$) for order 2.

4. The mechanical resonator as claimed in claim 3, wherein the octagonal vibrating structure is made of quartz.

5. The mechanical resonator as claimed in claim 1, wherein, for a vibratory mode of order 3 (k=3), the plane vibrating structure is of dodecagonal shape and is made of a crystalline material with cubic structure, with a cut made in a plane containing the X axis, or the Y axis, or the Z axis, whereby the vibrating structure exhibits and isotropy of material ($\Delta f_m = 0$, $\Delta \alpha_m = 0$) for order 3.

6. The mechanical resonator as claimed in claim 5, wherein the dodecagonal vibrating structure is made of silicon.

7. The mechanical resonator as claimed in claim 1, wherein the suspension arms are n=4k in number and are angularly spaced by an angular interval of $\pi/2k$, whereby the vibrating structure exhibits an isotropy of suspension ($\Delta f_s 0$, $\Delta \alpha_s = 0$).

8. The mechanical resonator as claimed in claim 2, wherein the polygonal vibrating structure simultaneously exhibits isotropies of geometry ($\Delta f_g = 0$, $\Delta \alpha_g = 0$) and of material ($\Delta f_m = 0$, $\Delta \alpha_m = 0$) and of suspension ($\Delta f_s = 0$, $\Delta \alpha_s = 0$), in terms of frequency and coupling, whereby it is able to operate in gyrometric mode or in gyroscopic mode.

9. The mechanical resonator as claimed in claim 1, wherein the polygonal vibrating structure with 4k vertices is made of a crystalline material with non trigonal structure of k=2 or non cubic structure for k=3, and therefore exhibits basically an anisotropy of material ($\Delta f_m \neq 0$, $\Delta \alpha_m \neq 0$), and wherein said polygonal vibrating structure is then devised so as furthermore to exhibit at least one localized modification of geometry and/or the suspension arms exhibits at least one localized modification, so that said polygonal vibrating structure exhibits and anisotropy of geometry ($\Delta f_g \neq 0$, $\Delta \alpha_g \neq 0$) and/or an anisotropy of suspension ($\Delta f_s \neq 0$, $\Delta \alpha_s \neq 0$), respectively able to compensate for the anisotropy of material, whereby said polygonal vibrating structure exhibits an isotropy in terms of frequency ($\Delta f = 0$) and coupling ($\Delta \alpha = 0$) and the resonator is able to operate in gyrometric mode or in gyroscopic mode.

10. The mechanical resonator as claimed in claim 1, wherein the suspension arms are n<4k in number and are angularly spaced by an angular interval of $2\pi/n$, with n chosen such that $n \leq k-2$ or $n \geq k+2$ with $n \neq pk$ (p integer), the polygonal vibrating structure therefore exhibiting basically an anisotropy of suspension ($\Delta f_s \neq 0$, $\Delta \alpha_s \neq 0$) and wherein said polygonal vibrating structure is then devised so as to furthermore exhibit localized defects of geometry which are angularly offset by an angular value of $\pi/k$ and are able to cause a defect of mass of order 2k which engenders and anisotropy in terms of geometry ($\Delta f_g \neq 0$, $\Delta \alpha_g \neq 0$) able to compensate of the anisotropy of suspension due to the insufficient number of suspension arms, whereby said polygonal vibrating structure exhibits and isotropy in terms of frequency ($\Delta f = 0$) and coupling ($\Delta \alpha = 0$) and the resonator is able to operate in gyrometric mode or in gyroscopic mode.

11. The mechanical resonator as claimed in claim 10, herein the localized defects of geometry are situated at least in the vicinity of where the suspension arms are linked to the vibrating structure.

12. The mechanical resonator as claimed in claim 2, wherein the vibrating structure exhibits at least one anisotropy of geometry ($\Delta f_g \neq 0$, $\Delta \alpha_g \neq 0$), or of material ($\Delta f_m \neq 0$, $\Delta \alpha_m \neq 0$), or of suspension ($\Delta f_s \neq 0$, $\Delta \alpha_s \neq 0$) whereby said vibrating structure is able to operate only in gyrometric mode.

13. The mechanical resonator as claimed in claim 1, characterized in that the mount surrounds the plane vibrating structure and in that the suspension arms are outside the vibrating structure.

14. The mechanical resonator as claimed in claim 1, wherein the mount is a central hub substantially concentric with the vibrating structure and wherein the suspension arms are inside the vibrating structure.

15. The mechanical resonator as claimed in claim 13, further comprising resonating beams which are carried by a central hub substantially concentric with the vibrating structure with closed contour and which radiate around said central hub substantially in the plane of the vibrating structure with closed contour, whereby the mechanical resonator has the resonating beams and the vibrating structure situated substantially in the same plane and is able to detect the three components $\Omega x$, $\Omega y$ and $\Omega z$ of a rate of rotation $\Omega$ imparted to the mount, the components $\Omega x$ and $\Omega y$ being detected by the beams and the component $\Omega z$ being detected by the vibrating structure with closed contour and whereby the mechanical resonator is able to operate in gyrometric mode or in gyroscopic mode on the three axes.

16. The mechanical resonator as claimed in claim 14, further comprising resonating beams which are carried by a central hub substantially concentric with the vibrating structure with closed contour and which radiate around said central hub substantially in the plane of the vibrating structure with closed contour, whereby the mechanical resonator has the resonating beams and the vibrating structure situated substantially in the same plane and is able to detect the three components $\Omega x$, $\Omega y$, and $\Omega z$ of a rate of rotation $\Omega$ imparted to the mount, the components $\Omega x$ and $\Omega y$ being detected by the resonating beams and the component $\Omega z$ being detected by the vibrating structure with closed contour and whereby the mechanical resonator is able to operate in gyrometric mode or in gyroscopic mode on the three axes.

17. The use of a plane mechanical resonator sensitive along the transverse axis to operation in gyroscopic mode as claimed in claim 11, within a plane monolithic gyro-accelerometric inertial sensor able to provide the information $\Omega x$, $\Omega y$, $\Omega z$ and $\gamma_x$, $\gamma_y$, $\gamma_z$.

* * * * *